United States Patent
Mc Cullough et al.

(10) Patent No.: US 7,266,434 B2
(45) Date of Patent: Sep. 4, 2007

(54) INTERACTIVE SYSTEM AND METHOD FOR CUSTOMIZATION OF AN ADJUSTABLE VEHICULAR FEATURE

(75) Inventors: Scott A. Mc Cullough, Sterling Heights, MI (US); David A. Osinski, Sterling Heights, MI (US); Richard A. Young, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/704,076

(22) Filed: Nov. 7, 2003

(65) Prior Publication Data

US 2005/0102077 A1   May 12, 2005

(51) Int. Cl.
G06F 7/00 (2006.01)
G06F 17/00 (2006.01)
(52) U.S. Cl. .................. 701/36; 340/5.7; 345/173
(58) Field of Classification Search ............ 701/36, 701/49; 340/5.7, 5.72, 5.83, 539.1, 825.69, 340/825.25, 825.24; 345/173, 156; 713/200
See application file for complete search history.

(56) References Cited

U.S. PATENT DOCUMENTS

| | | | | |
|---|---|---|---|---|
| 5,525,977 A | * | 6/1996 | Suman | 340/825.25 |
| 6,032,089 A | * | 2/2000 | Buckley | 701/36 |
| 6,100,811 A | * | 8/2000 | Hsu et al. | 340/5.83 |
| 6,131,060 A | * | 10/2000 | Obradovich et al. | 701/49 |
| 6,198,996 B1 | * | 3/2001 | Berstis | 701/36 |
| 6,373,472 B1 | * | 4/2002 | Palalau et al. | 345/173 |
| 6,615,123 B2 | * | 9/2003 | Morehouse | 701/49 |
| 6,718,240 B1 | * | 4/2004 | Suda et al. | 701/36 |
| 6,927,682 B1 | * | 8/2005 | Touhey et al. | 340/457.4 |
| 2002/0197976 A1 | * | 12/2002 | Liu et al. | 455/352 |

* cited by examiner

Primary Examiner—Dalena Tran

(57) ABSTRACT

An interactive system for customizing at least one operational feature on a vehicle by an operator comprises an input device for receiving operator selection data and a message generating device. To assist an operator during the customization process, the message generating device generates a plurality of operator recognizable comments in response to the operator selection data. A processor coupled to the input device and to the message generating device recognizes the operator selection data and directs the message generating device to generate selected ones of the operator recognizable comments.

14 Claims, 6 Drawing Sheets

INTERACTIVE SYSTEM AND METHOD FOR CUSTOMIZATION OF AN ADJUSTABLE VEHICULAR FEATURE

FIELD OF THE INVENTION

The present invention relates generally to adjustable vehicular systems, and more particularly to an interactive apparatus and method for customizing the programmable operational features of a motor vehicle.

BACKGROUND OF THE INVENTION

As technology in the automotive industry has advanced, vehicle features have increasingly become driver or passenger controllable. Components once controlled manually are now progressively automated, and many new customizable features are now readily available in modern vehicles. A driver may now, for example, adjust the height of a steering wheel to preference, or program vehicle doors to automatically lock at a particular time. Though such features are intended to make the use of a vehicle more enjoyable or efficient, the customization (personalization of vehicle feature settings) or adjustment process can sometimes be less than intuitive causing confusion on the part of the operator or driver of the vehicle.

User manuals and informational compact discs explaining the operation of vehicles and their customizable features are well-known. The effectiveness of such tools, however, is limited, and while a helpful salesperson may explain the use of certain features to a customer, it is often impractical for the salesperson to explain the controls for every particular feature, or for a buyer to remember how to operate a large number of controls after a brief tutorial.

In an effort to make customizable vehicular features more understandable, accessible, and manageable, various automated control systems have been employed. In general, such devices utilize an onboard computer and an interface comprised of a display device and at least one user input. A control system may, for example, employ a Liquid Crystal Display (LCD) odometer display to show feature option codes and control buttons or use of the vehicle's trip stem switch. A user may, for example, press control buttons to enter personalization menus, navigate feature options, and make selections. When selections are made there is feedback to the operator that the selection was made (both audible and textual on the display presenting the features and options).

Alternatively, on some vehicles the trip stem switch is used. The trip stem is pressed and held to enter the personalization menu list which comprises numerical feature codes and option codes, and the feature code begins to flash. The user may sequentially scroll through the numbers until a code representing the feature to be adjusted is found, briefly press the trip stem, and subsequently select the desired feature by pressing and holding the trip stem. Pressing and holding the trip stem again at a feature code results in entering the options selection mode where the current option code will be flashing. Similarly, a user may then sequentially scroll through the option codes representing various setting for modes for the selected vehicular feature and select amongst them by pressing and holding the trip stem. After selection, a processor associated with the control system signals the corresponding vehicle feature to accomplish the desired adjustment. When selections are made there is an audible feedback to the driver that the selection was made.

Though control systems of the type described above provide a single interface capable of controlling several features, such control units may still be confusing and cumbersome to use. Consequently, control systems with more advanced interfaces were developed. One such control system, referred to as a Driver Information Center (DIC), allows a user to navigate several levels of menus displayed on an LCD screen capable of displaying several lines of characters. The user may scroll through a first level menu with a first button, make selections and advance to the next level menu with a second button, or return to the previous menu with a third button. The number of buttons used to navigate the menus may vary by vehicle. After the user navigates the menus and makes a selection, the DIC computer will send a message (e.g. "lock all doors") to the module associated with the corresponding feature which is stored in a memory (e.g. "lock all doors when shift out of park").

While control systems such as a DIC are more easily understood than control systems with less advanced displays, displayed messages may still be relatively cryptic and confusing to a user due to system restraints (e.g. displayable character limitations). While larger screens capable of displaying more characters may help mitigate this problem, such displays are expensive to employ. Such control systems also provide little or no positive user feedback during the personalization or customization process. Furthermore, as the hierarchy of menus employed by control systems becomes increasingly complex (i.e. as the number of customizable features available on a particular vehicle grows), it becomes more likely that a user will forget or have difficulty navigating the proper path to adjust a particular feature.

It should thus be appreciated that it would be desirable to provide a vehicular on-board system capable of adjusting a plurality of customizable vehicular features that is relatively easy to understand and operate.

BRIEF SUMMARY OF THE INVENTION

According to a broad aspect of the invention there is provided an interactive system for customizing at least one operational feature on a vehicle by an operator comprising an input device for receiving operator selection data, and a message generating device for storing information. To assist an operator during the customization process, the message generating device generates a plurality of operator recognizable comments in response to the operator selection data. A processor is coupled to the input device and to the message generating device for recognizing the operator selection data and directing of the message generating device to generate selected ones of the operator recognizable comments.

According to a further aspect of the invention there is provided an interactive system for customizing at least one operational feature of an automotive vehicle by a vehicle operator comprising an input device for receiving operator supplied data and a compact disc player. The compact disc player receives a compact disc that contains information relating to at least one operational feature and generates audible comments relating to the customization process in response to the operator supplied data. The interactive system further comprises a display that displays messages relating to the customization of the at least one operational feature and a processor coupled to the input device, the compact disc player, and the display. The processor recognizes the operator supplied data and directs the compact disc player to generate selected ones of the comments contained on the compact disc.

According to a still further aspect of the invention there is provided a method for customizing at least one operational feature of an automotive vehicle comprising inserting a media storage device containing a plurality of operator recognizable comments into a media player, inputting operator data via an input device coupled to the media player, and processing the operator data via a processor coupled to both the media and the input device. In response to the operator data, the processor selects at least one operator recognizable comment from the plurality of operator recognizable comments, and the selected comment is generated via a message generating means (e.g. a display or speaker system) coupled to the media device.

BRIEF DESCRIPTION OF THE DRAWINGS

The present invention will hereinafter be described in conjunction with the following figures, wherein like numerals denote like elements.

DETAILED DESCRIPTION OF THE INVENTION

The following detailed description of the invention is merely exemplary in nature and is not intended to limit the scope, applicability, or configuration of the invention in any way. Rather, the following description provides a convenient illustration for implementing exemplary embodiments of the invention. Various changes to the described embodiments may be made in the function and arrangement of the elements described herein without departing from the scope of the invention.

Figure 1:
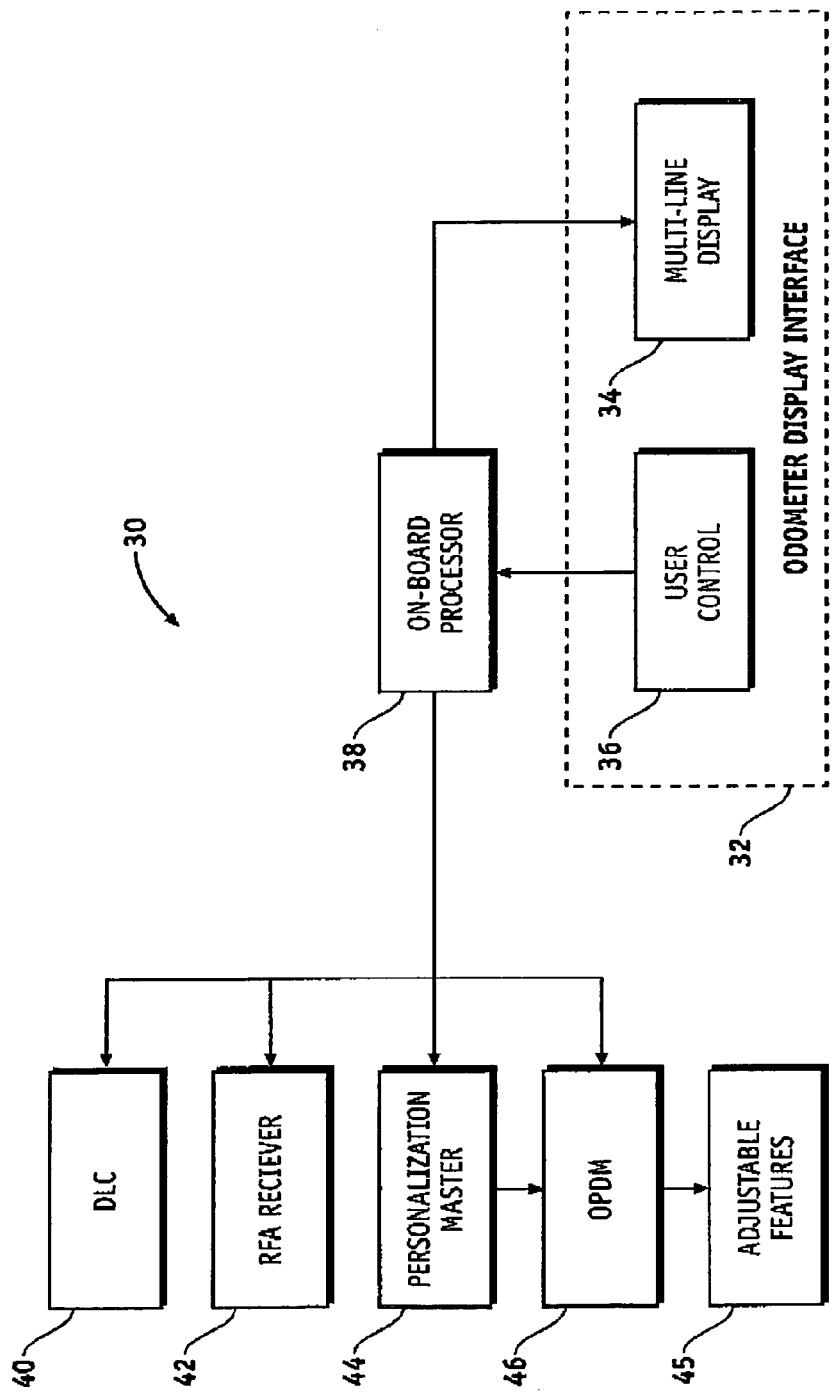
FIG. 1 is a block diagram of a control system utilizing an odometer display interface in accordance with the teachings of the prior art.

FIG. 1 is a block diagram of a known feature control system 30 including an odometer display interface 32. As can be seen, odometer display interface 32 includes a display 34 capable of displaying a line of numeric (or alphanumeric) characters and a user input device or control 36 (e.g. an odometer trip reset switch or trip stem) for receiving operator selection data. Coupled via serial data lines to display 34 and user control 36 is an on-board processor 38. Processor 38 is similarly coupled to a data link connector (DLC) 40, a Remote Function Actuator (RFA) receiver 42, a personalization master 44, and an Occupant Position Device Master (OPDM) 46. Control system 30 permits a driver to adjust an operational feature 45 (e.g. seats, the steering wheel, pedals, mirrors, etc.) of a motor vehicle. Additionally, control system 30 may permit the programming of conditions under which certain vehicular tasks or functions are to be performed. For example, control system 30 may allow vehicle doors to be programmed or set to lock at a particular vehicle speed.

A vehicle may remain configured to the most recent user adjustments, or control system 30 may switch between different groups of adjustments associated with different drivers in the well-known manner. Control system 30 may automatically configure adjustable vehicular features in accordance with a driver-specific setting group in the following way. First, personalization master 44 determines driver identity by, for example, wireless reception (via RFA receiver 42) of a signal emitted by a driver-specific keyfob. Personalization master 44 then transmits a corresponding driver identification signal to OPDM 46 and other modules which store multiple groups of settings associated with different drivers. OPDM and other modules 46 recall the settings associated with the identified driver and signals customizable feature 45 to adjust accordingly. To establish the a group of settings, or simply to adjust a vehicular feature, control system 30 employs a user selection process wherein user control or trip stem 36 is utilized to navigate through and select amongst a hierarchy of options displayed on display 34. Specifically, trip stem 36 may be briefly pressed or tapped to scroll through codes representing adjustable features or modes representing different settings of adjustable features. Trip stem 36 may then be pressed and held to select a particular feature or mode.

Figure 2:
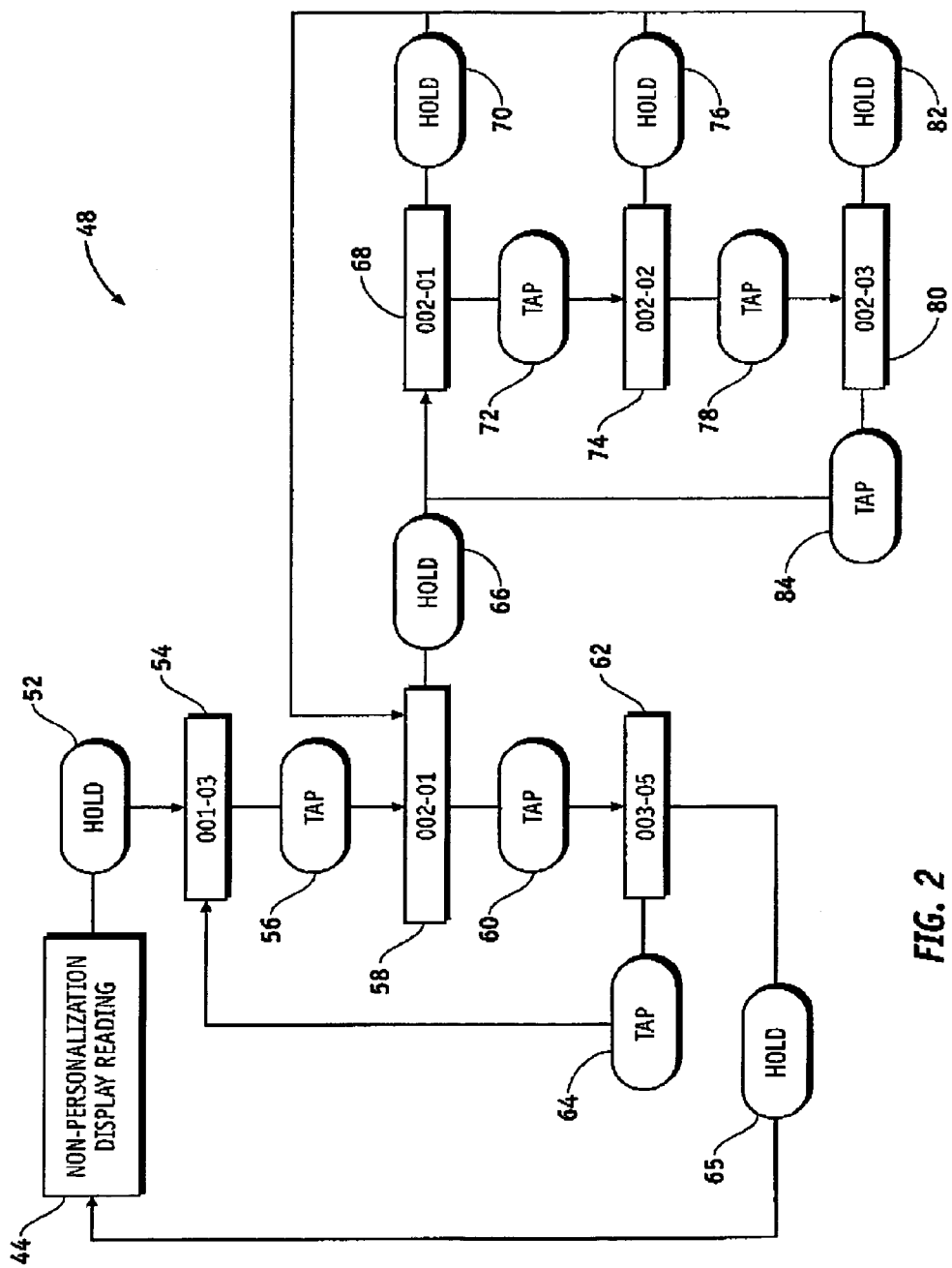
FIG. 2 is a flow chart illustrating an exemplary menu structure utilized by the odometer display interface shown in FIG. 1.

FIG. 2 is a flow chart of an exemplary menu option structure 48 suitable for navigation therethrough by an operator utilizing control system 30. As can be seen, display 34 comprises a non-personalization display reading 50 shown in the upper-left corner of FIG. 2 and personalization display readings 54, 58, 62, 68, 74, and 80. The personalization display readings represent various steps or stages of the user selection process and are divided into two levels: a first level personalization group comprising readings 54, 58, and 62, and a second level personalization group comprising readings 68, 74, and 80. It should be appreciated that the second level personalization group (i.e. display readings 68, 74, and 80) is generally associated with display reading 58 and specifically associated with the first numerical portion of reading 58 (i.e. 002). As can be seen in FIG. 2, the readings associated with the first and second level personalization groups (i.e. 54, 58, 62, 68, 74, and 80) each comprise two groups of numbers separated by a dash. For example, display reading 54 shows a first group 001 and a second group 03. The first number group (i.e. 001) represents an adjustable feature and may be commonly referred to as a feature code. The second number group (i.e. 03) represents the current setting of the adjustable feature identified by the feature code (i.e. 001) and may be commonly referred to as a feature mode. Thus, display reading 54 (i.e. 001-03) informs a user that the adjustable feature represented by the code 001 is currently set to the mode 03.

FIG. 2 shows three feature codes (i.e. 001, 002, and 003 shown at 54, 58, and 62 respectively) each having a different current mode (i.e. 03 for code 001, 01 for code 002, and 05 for code 003). It should be clear that there may be a plurality of modes associated with each feature code (i.e. feature code 003 has at least five feature modes 01-05 associated therewith) and that the number of feature codes and modes thereof will vary with the number of available adjustable features and settings thereof. It should be noted that exemplary option structure 48 may comprise two additional second level personalization groups associated with feature codes 001 and 003 (i.e. display readings 54 and 62 respectively) which are not shown in FIG. 2 for clarity. The first level personalization group (i.e. readings 54, 58, and 62) facilitates selection of feature codes, and the second level personalization group (i.e. readings 68, 74, and 80) facilitates selection of feature modes associated with a selected feature code as will be more fully explained hereinbelow.

As stated above, display 34 (FIG. 1) is shown in the upper-left corner of FIG. 2 as displaying a non-personalization reading 50; i.e. a reading consisting of information not associated with the personalization process such as mileage information. As is shown in FIG. 2, non-personalization display reading 50 changes to a first level personalization option reading 54 (i.e. 001-03) when trip stem 36 (FIG. 1) is pressed and held for a predetermined amount of time (e.g. three seconds) as is represented by HOLD 52. From display reading 54 (i.e. 001—03), one of two paths may be taken: (1) the next personalization group level (i.e. a second level personalization group associated with the displayed feature code 001, not shown in FIG. 2) may be accessed by pressing and holding trip stem 36, or, (2) the next feature code (i.e. 002 of reading 58) may be reached by tapping trip stem 36 (TAP 56). That is, display reading 54 (i.e. 001—03) will change to the next feature code reading 58 (i.e. 002—01) when trip stem 36 is tapped (TAP 56) causing a migration to display reading 58 having a feature code 002 and a feature mode 01 (i.e. 002-01). Again, from reading 58, one of two paths may be taken: (1) the next personalization group level (i.e. the second level personalization group associated with feature code 002 comprising readings 68, 74, and 80) may be accessed by pressing and holding trip stem 36 (HOLD 66), or (2) the next feature code (i.e. 003 of reading 62) may be reached by tapping trip stem 36 (TAP 60). This process of navigating through the first level personalization group is repeated (1) until a second level personalization group is accessed in the above described manner, or (2) until all vehicular feature codes (i.e. 001 through 003) have been cycled through, in which case display 34 will return to feature code display mode 54. After reaching feature code 62 (i.e. 003-05), non-personalized display mode 50 may be reached by pressing and holding trip stem 36 (HOLD 65).

After the second level personalization group associated with feature code 002 (i.e. comprising display readings 68, 74, and 80) is accessed in the above described manner, display 34 will show display reading 68 (i.e. 002-01). Trip stem 36 may be pressed and held (HOLD 70) at this time to select the feature mode 01, or trip stem 36 may be tapped (TAP 72) to progress to the next feature mode (i.e. 02) as shown in display reading 74. Additional tapping of trip stem 36 will progress through subsequent feature codes (TAP 78 will result in display 34 showing reading 80) until the all feature codes have been displayed. After all feature codes have been displayed, an additional tap (TAP 84) will return display 34 to the first reading listed in the feature modes (i.e. display reading 68). Pressing and holding trip stem 36 (HOLD 70, HOLD 76, or HOLD 82) during this selection process will result in corresponding mode selection and reversion of display 34 to the last reading listed in the previous personalization group (i.e. reading 58).

For illustrative purposes, the following relates to the user selection process for programming a vehicle's doors (represented by feature code 002) to lock at fifteen miles per hour (represented by feature mode 03) via the exemplary option structure 48 shown in FIG. 2. User control 36 is pressed and held (HOLD 52) causing non-personalization display reading 50 to change to personalization display reading 54 (i.e. 001-03). Trip stem 36 is then tapped (TAP 56) to progress from display reading 54 (i.e. 001-03) to display reading 58 (i.e. 002-01). As display reading 58 indicates, the adjustable feature represented by the feature code 002 (i.e. the door locks) currently is set to feature mode 01 (i.e. manual locking and unlocking of vehicle door). In the present example, it is desired to change feature code 002's current feature mode 01 to a new feature mode 03 (i.e. wherein vehicle doors will lock at fifteen miles per hour). Thus, having now located the desired feature code (i.e. 002), user control 36 is pressed and held (HOLD 66) until display reading 58 (i.e. 002-01) changes to a second level display reading 68 (i.e. 002-01) indicated when the feature mode (i.e. 01) begins to flash. Next, trip stem 36 is tapped twice (TAP 72 and TAP 78) to respectively progress from display reading 68 (i.e. 002-01) to display reading 74 (i.e. 002-02) and from display reading 74 (i.e. 002-02) to display reading 80 (i.e. 002-03). Having now located the desired feature mode (i.e. 03), trip stem 36 is pressed and held (HOLD 82) thereby selecting feature mode 03. After HOLD 82, display 34 returns to the last personalization group display reading 58 (i.e. 001-03). Following this user selection process, processor 38 (FIG. 1) monitors vehicle speed via a vehicle speed sensor (not shown) and controls the vehicle's doors to lock when the vehicle's speed reaches fifteen miles per hour. Also following the exemplary user selection, display reading 58, which previously displayed 002-01, will now display 002-03 in accordance with the new user setting.

Figure 3:
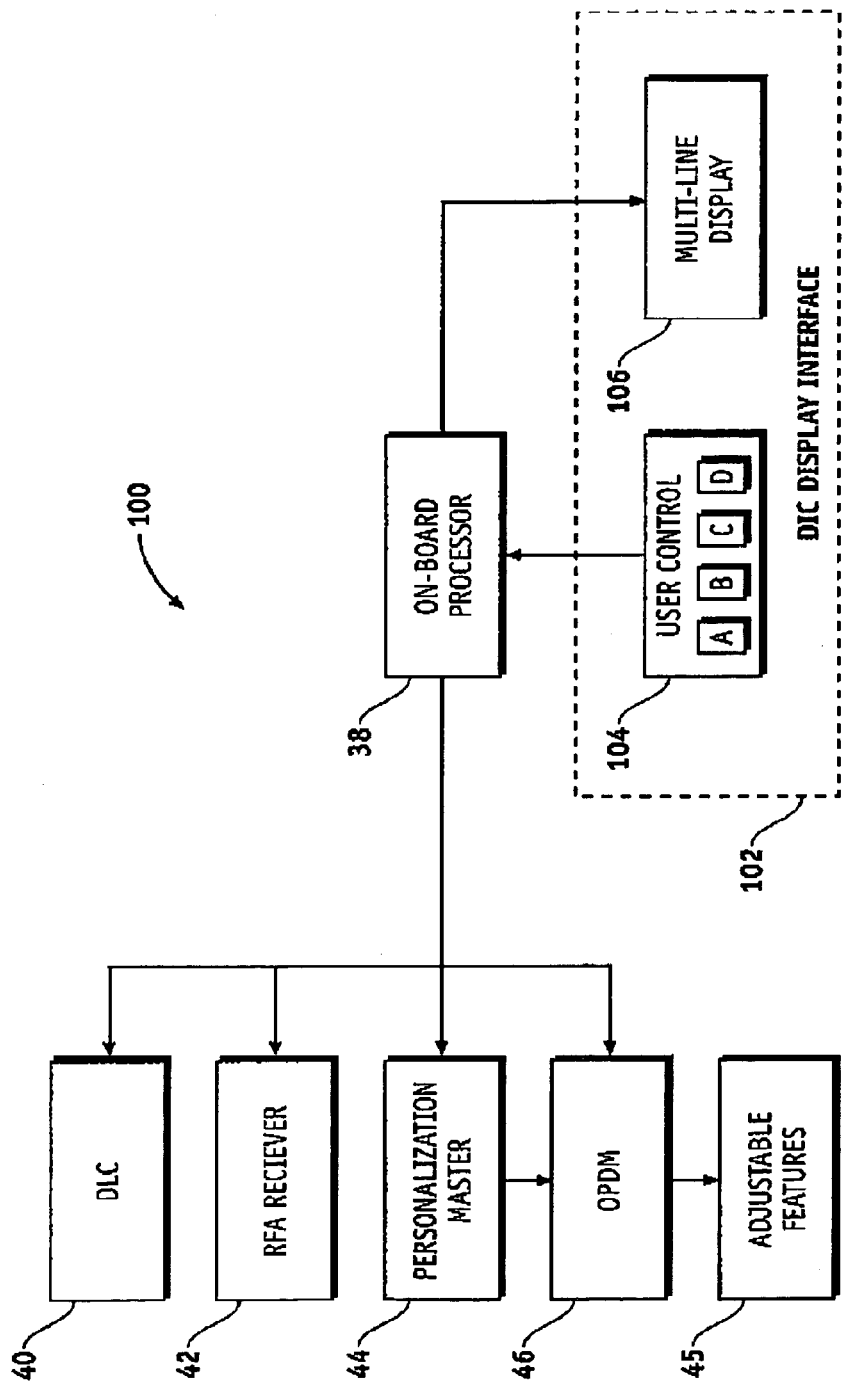
FIG. 3 is a block diagram of a control system utilizing a DIC interface in accordance with the teachings of the prior art.

FIG. 3 is a block diagram of a control system 100 utilizing a Driver Information Center (DIC) interface 102 in accordance with teachings of prior art. As can be seen, DIC interface 102 comprises a user control 104 having a plurality of inputs (e.g. buttons) A, B, and C disposed thereon and a display 106 capable of displaying several lines of alphanumeric characters. However, it should be appreciated that control system 100 may be provided with any respective number or type of inputs or display. Coupled to display 106 and user control 104 is an on-board processor 38, which is similarly coupled to a plurality of vehicular modules 40, 42, 44, 45, and 46 described hereinabove in conjunction with control system 30 (FIGS. 1 and 2).

Figure 4:
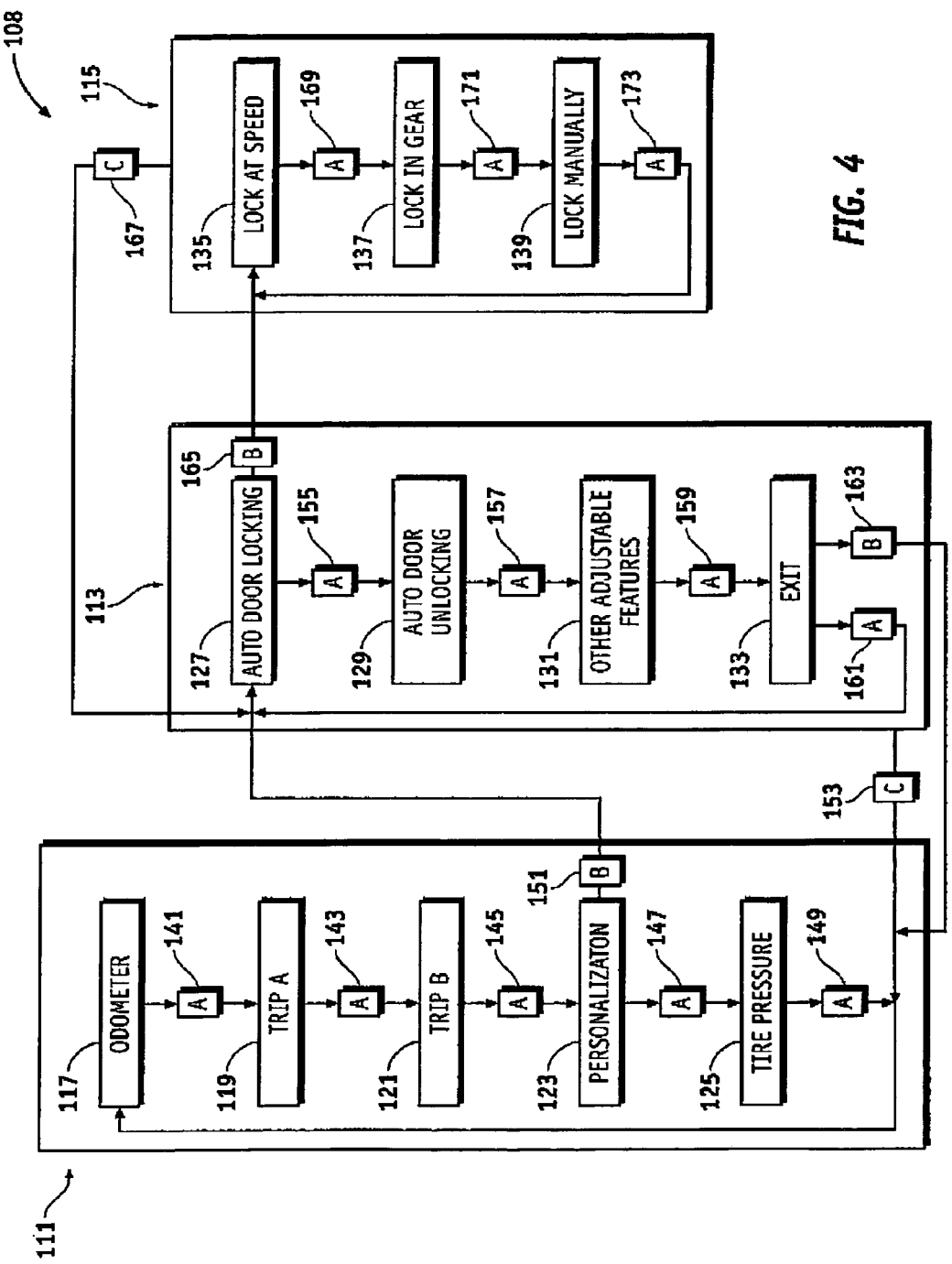
FIG. 4 is a flow chart illustrating an exemplary menu structure utilized in the DIC interface shown in FIG. 3.

The selection process utilized by control system 100 is similar to that utilized by control system 30, as may be appreciated by referring to FIG. 4 which is a flow chart illustrating an exemplary menu structure 108 suitable for use with the DIC interface shown in FIG. 3. In contrast to display 34 (FIG. 1) employed in control system 30 which is capable of displaying only one option at one time, display 106 (FIG. 3) employed in control system 100 may display a full menu consisting of several options simultaneously (e.g. menus 111, 113, and 115 shown in FIG. 4). Thus, control system 100 permits options listed in a particular menu to be navigated without a change in display reading. The appearance of an option is altered when it may be selected. An option may flash, for example, when it may be selected. Menus 111, 113, and 115 have a hierarchal relationship. That is, menu 113 is associated with one display option of menu 111 (i.e. PERSONALIZATION menu option 123) and menu 115 is associated with one feature option of menu 113 (i.e. AUTO DOOR LOCKING feature option 127). Thus, menus 111, 113, and 115 may be referred to as first, second, and third level menus respectively. It should thus be appreciated that FIG. 4 shows in total three different menus: a first level menu 111 comprising ODOMETER display option 117, TRIP A display option 119, TRIP B display option 121, PERSONALIZATION menu option 123, and TIRE PRESSURE display option 125; a second level menu 113 comprising AUTO DOOR LOCKING feature option 127, AUTO DOOR UNLOCKING feature option 129, OTHER ADJUSTABLE FEATURES 131, and an EXIT option 133; and a third level menu 115 comprising LOCK AT SPEED mode option 135, LOCK IN GEAR mode option 137, and LOCK MANUALLY mode option 139. The asterisk shown proximate LOCK MANUALLY mode option 139 indicates current mode selection. That is, the asterisk shown in FIG. 4 indicates that AUTO DOOR LOCKING feature 127 is currently programmed to lock manually.

While exemplary option structure 48 (FIG. 2) was navigated via trip stem 36 (FIG. 1) in control system 30, exemplary menu structure 108 is navigated via buttons A, B, and C in control system 100. Buttons A, B, and C are each assigned different functions; in this example, button A scrolls through menu selections, button B selects amongst those menu selections, and button C returns to a previous menu level. As can be seen in FIG. 4, ODOMETER display option 117 is the first option listed in first level menu 111. Thus, ODOMETER display option 117 will flash as it is the first potential user selection. From this point, button B may be pressed to select ODOMETER DISPLAY Option 117. This will result in display 106 displaying odometer information (i.e. mileage information). Alternatively, button A may be pressed as is shown in FIG. 4 at 141 to progress to the next display option (i.e. TRIP A display option 119). As the new potential selection, TRIP A display option 119 would thus begin to flash and ODOMETER display option 117 would cease to flash. From this point, TRIP A display option 119 may be selected by pressing button B or the next option (i.e. TRIP B display option 121) may be reached by pressing button A. Pressing button A as is shown in FIG. 4 at 149 at the last display option (i.e. TIRE PRESSURE display option 125) will result in the first display option listed (i.e. ODOMETER display option 117) again becoming the potential selection.

The above described process thus continues until a display option is selected or until PERSONALIZATION menu option 123 is selected by pressing button B as is shown in FIG. 4 at 151. In the event of PERSONALIZATION menu option 123 selection, display 106 changes to a second level menu 113 comprising several options representing personalizable vehicular features (i.e. AUTO DOOR LOCKING feature option 127, AUTO DOOR UNLOCKING feature option 129, and OTHER ADJUSTABLE FEATURES 131). At this point, if button A is pressed as is shown at 155 the next feature option (i.e. AUTO DOOR UNLOCKING feature option 129) will begin to flash, or, if button B as is shown at 165 is pressed display 106 will change to a third level menu (i.e. menu 115) associated with the selected feature option (i.e. AUTO DOOR LOCKING feature option 127). From AUTO DOOR LOCKING feature option 127, OTHER ADJUSTABLE FEATURES 131 may be reached by pressing button A twice as is shown at 157 and 159. Selecting OTHER ADJUSTABLE FEATURES 131 or AUTO DOOR UNLOCKING feature option 129 would result in display 106 changing to a third level menu having feature mode options respectively associated with other adjustable features or auto door unlocking. However, in the interest of clarity, only third level menu 115 (associated with AUTO DOOR LOCKING feature option 127) is shown in FIG. 4. If button A is pressed as is shown at 161 when the last option listed (i.e. EXIT 133) is the potential selection, then AUTO DOOR LOCKING feature option 127 will become the new potential selection. If EXIT 133 is selected by pressing button B as is shown in FIG. 4 at 163, display 106 will revert to first level menu 111. Similarly, if button C is pressed at any point during the navigation of second level menu 113 (i.e. shown at 153 in FIG. 4), display 106 will revert to first level menu 111.

Third level menu 115 is reached by pressing B as is shown at 165 when AUTO DOOR LOCKING feature option 127 is the potential selection. The first mode option listed in menu 115 is LOCK AT SPEED mode option 135. This mode option may be selected by pressing button B, or the next mode option (i.e. LOCK IN GEAR mode option 137) may be reached by pressing button A as is shown at 169. After this, LOCK MANUALLY mode option 139 may be reached by pressing button A as is shown at 171. When LOCK MANUALLY mode option 139 is the potential selection, pressing button A as is shown at 173 will cause LOCK AT SPEED mode option 135 to become the new potential selection. Pressing button C at any time during this part of the selection process (i.e. as is shown in FIG. 4 at 167), will cause display 106 (FIG. 3) to revert to the previous menu (i.e. second level menu 113).

For illustrative purposes, the following again relates to a user selection process for programming a vehicle's doors to lock at a particular speed via exemplary option structure 100 shown in FIG. 4. As previously mentioned, the first option listed in menu 111 is ODOMETER display option 117. From this point, button A is pressed three times (i.e. shown at 141, 143, and 145) to respectively progress from ODOMETER display option 117 through TRIP A display option 119 and TRIP B display option 121 to PERSONALIZATION menu option 123. PERSONALIZATION menu option 123 is then selected by pressing button B as is shown at 151. This results in display 106 (FIG. 3) changing from first level menu 111 to second level menu 113. The first feature option displayed in menu 113 is AUTO DOOR LOCKING feature option 127. As this is the desired feature option, button B is pressed as is shown at 165 causing display 106 (FIG. 3) to progress to third level menu 115. The first option listed in third level menu 115 is LOCK AT SPEED mode option 135. As this is the desired feature mode, button B is to select LOCK AT SPEED mode option 135. This results in the vehicle doors locking at a particular speed (e.g. fifteen miles per hour) in the manner described hereinabove.

It should thus be apparent that, although control systems such as DIC control system 100 are more easily navigable and understandable than control systems employing more limited interfaces (e.g. control system 30), control systems of the type described above in conjunction with FIGS. 3 and 4 may still be relatively confusing to use and provide little to no positive feedback during the customization process.

Figure 5:
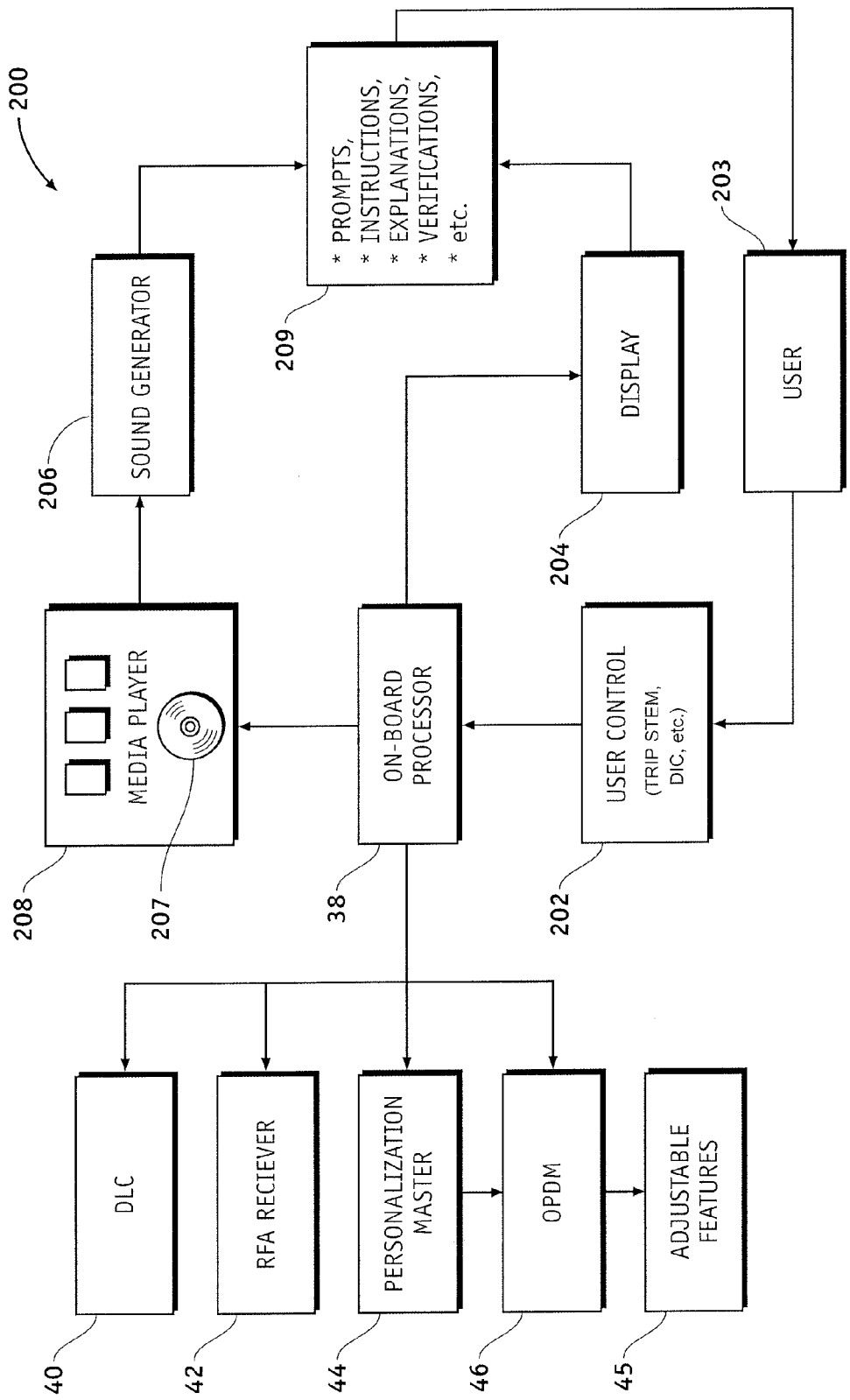
FIG. 5 is a block diagram of an interactive control system in accordance with the present invention.

FIG. 5 is a block diagram of an interactive control system 200 in accordance with the present invention. On-board processor 38 is coupled to a user input device or control 202 which receives input data from operator or user 203, a display 204, vehicular modules 40, 42, 44, 45, and 46 (described hereinabove), and a media player 208. Media player 208 is, in turn, coupled to a sound generator or speaker system 206 which may be, for example, part of an onboard entertainment center. As can be seen, media player 208 includes a plurality of user inputs (e.g. buttons) D, E, and F which enable the reception of additional operator selection data; however, any suitable number or type of user inputs may be employed in control system 200. Media player 208 receives a data storage unit 207 which contains a plurality of operator recognizable comments 209 as will be more fully described below. Though media player 208 is shown as a compact disc player and media storage unit 207 is shown as a compact disc in FIG. 5, it should be appreciated that media player 208 and storage unit 207 may take any suitable form. It should further be appreciated that media player 208 may be provided with a display independent of display 204 (e.g. an LCD display of the type commonly utilized in a compact disc player), which may also produce visual signals in accordance with data stored on the data storage unit.

As stated above, the system 200 contains a plurality of operator recognizable comments 209 produced via at least one output means one such as a message generating device. For example, operator recognizable comments 209 may be sounds produced via a sound generating device (e.g. speaker system 206) and/or visual signals produced via a visual indication means (e.g. display 204). On-board processor 38 may direct media player 208 to generate certain ones of operator recognizable comments 209 during different stages of a user selection process. Thus, the inventive control system allows the generation of text messages displayed on display 204 and the generation of operator or user recognizable comments 207 stored on a data storage unit to be coordinated. In this way, interactive control system 200 may provide a user with audible comments (e.g. vocal instructions relating to the entry of a personalization menu and how to navigate such a menu, vocal explanations of adjustable features and possible adjustments, selection confirmation, etc.) via speaker system 206 in coordination with text messages displayed on display 204. Control system 200 thus assists a user by providing interactively guidance and substantial positive feedback during the customization process.

In a first embodiment, control system 200 may comprise in part a pre-existing control system of the type described hereinabove in conjunction with FIGS. 1 and 2. For example, control system 200 may be utilized with an odometer display interface such as that shown in FIGS. 1 and 2 wherein user control 202 comprises a trip stem and display 204 comprises a single line display, and control system 200 utilizes an exemplary option structure similar to that shown in FIG. 2. In a second embodiment, control system 200 may comprise, in part, a control system of the type described in conjunction with FIGS. 3 and 4. For example, control system 200 may be utilized with a DIC display interface wherein user control 202 comprises a plurality of user inputs (e.g. buttons) A, B, C and D, display 204 comprises a multi-line, alphanumeric display, and control system 200 utilizes an exemplary option structure such as that depicted in FIG. 4. Thus, for illustrative purposes, the following description begins with a discussion of the exemplary user selection process described in conjunction with FIG. 2 and performed via the inventive control system 200. This is followed by a discussion of the exemplary user selection process described in conjunction with FIG. 4 and performed via inventive control system 200.

As stated above, the object of the exemplary user selection process is to set a vehicle's doors to lock at a particular speed (e.g. fifteen miles per hour). To begin, user control 202 is pressed and held (HOLD 52 in FIG. 2) causing non-personalization display reading 50 to change to display reading 54 (e.g. 001-03 in FIG. 2). In accordance with the present invention, processor 38 substantially contemporaneously sends a serial data instruction to media player 208 directing media player 208 to generate, for example, a first operator recognizable comment associated with the first vehicle feature code (e.g. 001) and a second operator recognizable comment associated with the current mode (e.g. 03) of the vehicle feature. Other audible user recognizable comments stored on data storage unit 207 may also be produced to guide a user through the selection process. For example, after accessing personalization mode (HOLD 52 in FIG. 2), an audible and/or graphical message associated with this action may be generated via speaker system 206 and/or a display means (e.g. display 204) respectively such as, "PERSONALIZATION MODE ACTIVATED." Following this, a message associated with the current vehicle feature code (e.g. 001 in FIG. 2) may be similarly generated such as, "YOUR CURRENT OPTION IS HEADLAMP SETTINGS." Assuming that feature code 001 represents headlamp setting and feature mode 03 represents a mode of turning off after the vehicle has been parked, a third audio message associated with the current setting of the displayed vehicle feature (e.g. 03 in FIG. 2) may then be generated such as, "HEADLAMPS ARE SET TO AUTOMATICALLY TURN-OFF AFTER THE VEHICLE HAS BEEN PLACED IN PARK." A final, generic message guiding a user through the selection process might then be generated such as, "IF YOU WOULD LIKE TO ADJUST THIS FEATURE, PLEASE PRESS AND HOLD THE TRIP STEM. IF YOU WOULD LIKE TO SELECT ANOTHER FEATURE PLEASE TAP THE STRIP STEM." In accordance with the present example, trip stem 202 is then tapped once (TAP 56 in FIG. 2) to progress from display reading 54 (e.g. 001-03 in FIG. 2) to display reading 58 (e.g. 002-01 in FIG. 2). In response to this action, control system 200 might again generate at least one user recognizable comment. Assuming that mode 01 for feature code 002 signifies a manual setting for vehicle door locks, the following message may be generated: "YOUR CURRENT OPTION IS DOOR LOCK SETTINGS. DOOR LOCKS ARE NOW SET TO BE MANUALLY LOCKED AND UNLOCKED. IF YOU WOULD LIKE TO ADJUST THIS FEATURE, PLEASE PRESS AND HOLD THE TRIP STEM. IF YOU WOULD LIKE TO SELECT ANOTHER FEATURE PLEASE TAP THE STRIP STEM." In this way, control system 200 would interactively guide a user step-by-step through the remainder of the exemplary selection process.

It should be appreciated that any number of audible comments may be stored on data storage unit 207 and produced during the user selection process. For example, control system 200 may provide for user verification after a feature mode is selected. For instance, a user might be audibly prompted to press and hold trip stem 202 to confirm a particular selection by pressing trip stem 202. In example above, after selecting the desired feature mode (e.g. 03 for feature code 001) by pressing and holding trip stem 202 (HOLD 82), control system 200 may generate a verification message such as, "YOU HAVE SET VEHICLE DOORS TO LOCK WHEN YOUR VEHICLE REACHES A SPEED OF FIFTEEN MILES PER HOUR. IF THIS IS THE CORRECT SETTING, PLEASE PRESS AND HOLD THE TRIP STEM. IF THIS SETTING IS NOT CORRECT, PLEASE BRIEFLY TAP THE TRIP STEM." It should thus be appreciated that inventive control system 200 may decrease user frustration by reducing the necessity of rote memorization of a large number of codes or a complex customization process.

It can be seen in FIG. 5 that media player 208 is provided with three user inputs or buttons X, Y, and Z; however, it should be appreciated that media player 208 may comprise any quantity or type of user inputs. It should also be understood that user control 202 may comprise controls associated with a feature of the vehicle. It is an aspect of the inventive control system to permit user inputs associated with an onboard entertainment center (e.g. user inputs provided on media player 208) or other controls associated with a vehicle feature to be utilized in the customization process. In a first example, button X may be assigned as a replay or repeat button. In this way, an operator recognizable comment may be reproduced when desired. That is, when button X is pressed, processor 38 may instruct media player 208 to replay and/or re-display the last comment generated. Utilization of inputs provided on media player 208 may be especially desirable when the inventive system is employed in conjunction with an interface having a limited number of user inputs. If the inventive control system 200 utilizes an odometer display interface such as that shown in FIG. 2, for example, navigation may be made easier by utilizing a plurality of buttons provided on media player 208 in lieu of (or in conjunction with) user control 202. Thus, in a second example, buttons X, Y, and Z are each assigned a different function: button X selects a particular feature or setting thereof, button Y scrolls through available options, and button Z returns to a previous option level. User recognizable comments 209 generated by inventive control system 200 would vary accordingly. For example, after accessing personalization mode, the following audible comment may be produced: "YOUR CURRENT SELECTION IS HEADLAMP SETTINGS. HEADLAMPS ARE SET TO AUTOMATICALLY TURN-OFF AFTER THE VEHICLE HAS BEEN PLACED IN PARK. IF YOU WOULD LIKE TO CHANGE THE HEADLAMP SETTING, PLEASE PRESS BUTTON X ON YOUR CD PLAYER. IF YOU WOULD LIKE TO SELECT ANOTHER ADJUSTABLE FEATURE, PLEASE PRESS BUTTON Y. PRESS BUTTON Z TO RETURN TO THE PREVIOUS MENU." It should thus be appreciated that the inventive control system 200 may make navigation of customizable option structures more straightforward and efficient.

Figure 6:
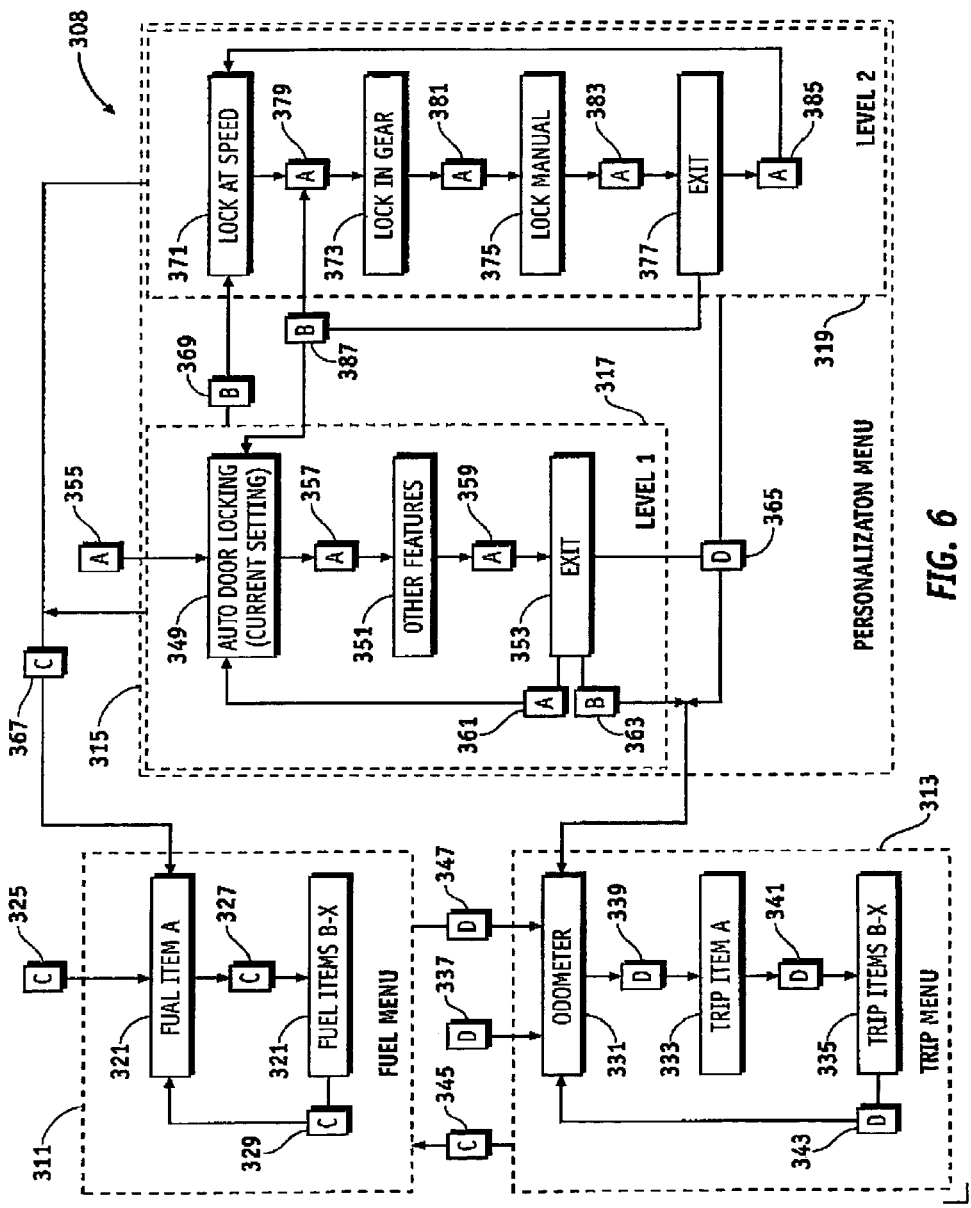
FIG. 6 is a flow chart illustrating an exemplary menu structure utilized in the DIC interface shown in FIG. 3.

The following relates to the exemplary user selection process described in conjunction with FIG. 4 as performed via the inventive control system 200 in accordance with a second embodiment. As stated above, control system 200 provides interactive guidance by coordinating text messages displayed on display 204 with the production of operator recognizable comments stored on data storage unit 207. FIG. 6 is a flow chart illustrating another exemplary menu structure 308 utilized in conjunction with the DIC interface shown in FIG. 3. As can be seen, the exemplary menu structure 308 includes a FUEL MENU 311 a TRIP MENU 313, and a PERSONALIZATION MENU 315. PERSONALIZATION MENU 315 further comprises a Level 1 menu 317 and a Level 2 menu 319.

FUEL MENU 311 is entered by pressing DIC button C for a predetermined period of time (e.g. two seconds) as is shown at 325. FUEL MENU 311 includes a plurality of FUEL ITEMS A-X as is shown at 321 and 323. Examples of fuel items to be displayed are AVERAGE MILES PER GALLON and REMAINING FUEL RANGE. Repeated pressing of DIC button C results in the sequential scrolling through FUEL ITEMS A-X. For example, it can be seen that pressing button C will result in a scrolling from FUEL ITEM A (321) to subsequent fuel items B-X (323). Pressing button C after fuel item X is displayed will result in a return to the first fuel item (FUEL ITEM A) as is shown at 329.

TRIP MENU 313 may be entered by pressing DIC button D as is shown at 337. This will result in an ODOMETER display as is shown at 331. Further pressing of button D will result in scrolling through TRIP ITEMS A-X as is represented at 339, 333, 341, and 335. That is, after TRIP MENU 313 has been entered resulting in an ODOMETER display, pressing button D will result in the display of TRIP ITEM A. Further pressing of button D will cause TRIP ITEM B to be displayed. By continued sequential pressing of button D, each of TRIP ITEMS D-X may be selected. Examples of trip items comprise TRIP MILEAGE, REMAINING OIL LIFE, TIRE PRESSURE, etc. Pressing button D after TRIP ITEM X has been selected will result in a return to ODOMETER display 331 as is shown at 343. As can be seen, TRIP MENU 313 may be entered from FUEL MENU 311 by pressing button D as is shown at 347. Similarly, FUEL MENU 311 may be entered from TRIP MENU 313 by pressing button C as is shown at 345.

In a similar manner, PERSONALIZATION MENU 315 may be entered by pressing DIC button A as is shown at 355. Level 1 of PERSONALIZATION MENU 355 contains a number of feature selections such as AUTO DOOR LOCKING, EXIT LIGHTING, ALERT SOUNDS, etc. Only AUTO DOOR LOCKING 349 is shown specifically in FIG. 6 for clarity. Using the techniques described above, the features contained in LEVEL 1 MENU 317 may be scrolled through by the sequential pressing of button A. For example, the initial pressing of button A will result in entry to the AUTO DOOR LOCKING feature as is shown at 349. This will result in the display of the current setting of the AUTO DOOR LOCKING feature. Further pressing of button A will result in the sequential selection of OTHER FEATURES 351. Still further pressing of button A at 359 will result in the selection of EXIT 353 whereupon the pressing of button A (361) will cause the display to return to the first feature AUTO DOOR LOCKING shown at 349. Pressing button B from EXIT 353 will return the user to the TRIP MENU 313 as is shown at 363 as will button D as is shown at 365.

Assuming that the user desires to personalize the AUTO DOOR LOCKING feature, the user may press DIC button B as is shown at 369 to enter the LEVEL 2 MENU 319 as is shown at 369. Once in the LEVEL 2 MENU, the user may personalize the AUTO DOOR LOCKING feature by scrolling through a number of options specific to the AUTO DOOR LOCKING function. For example, the doors may be caused to automatically lock at a certain speed as is shown at 371. Alternatively, the doors may be automatically locked when the vehicle is placed in gear as is shown at 373. If desired, the user may select a manual locking mode as is shown at 375. Clearly, other options are possible but have not been included for the sake of clarity. The user may return to the first option LOCK AT SPEED 371 after scrolling through all the options (by sequentially pressing button A as is shown at 379, 381, and 383) by again pressing button A (385) after reaching EXIT 377. Pressing button B at any point in the LEVEL 2 MENU will return the user to the LEVEL 1 features as is shown at 387. If desired, this transition may be accompanied by a chime and/or a display of specific feedback text. Pressing button C at any point in PERSONALIZATION MENU 315 will return the user to FUEL MENU 311 as is shown at 367. Furthermore, the user may transition to TRIP MENU 313 from LEVEL 2 MENU 319 by pressing button D as is shown at 365.

In accordance with the present invention, control system 200 provides interactive guidance by coordinating text messages displayed on display 204 with the production of operating recognizable comments stored on a data storage unit 207. For example, at AUTO DOOR LOCKING feature option 349, control system 200 may generate a corresponding audible message such as, "VEHICLE DOORS ARE CURRENTLY SET TO LOCK WHEN THE VEHICLE IS PLACED INFO GEAR. IF YOU WOULD LIKE TO CHANGE THIS SETTING, PRESS BOTTON B". It should thus be appreciated that user recognizable comments (e.g. audible or graphical messages) may be generated in this way at each step of the user-selection process.

As described hereinabove, control system 200 may also provide a step of confirmation or verification to ensure that a user does not mistakenly access a menu or chose an undesired setting. For example, after button A is pressed as shown at 349 in FIG. 6 to select the PERSONALIZATION menu option 315, an audible and/or graphical comment (i.e. a verification message) corresponding to the selection of a personalization menu option may be generated such as, "YOU HAVE SELECTED PERSONALIZATION".

It should thus be appreciated that control system 200 interactively prompts a user in real-time through the selection process and minimizes user errors. Unlike prior art control systems such as those discussed above, the inventive control system provides substantial positive feedback and natural language guidance resulting in a more user-friendly customization process. Consequently, the inventive control system mitigates several areas of concern associated with prior art control systems such as the issue of sales people (or subsequent sellers) taking too little time to train vehicle buyers, the issue of user confusion during the customization process, and the issue of user ignorance of available customizable features.

Though the present invention has been described in conjunction with interfaces including displays, it should be understood that the inventive control system may solely utilize an audible menu structure and may thus be employed in a control system lacking a display. It should further be understood that media player 208 may include an integral display and user inputs, which may be utilized in the selection process as described above. For example, media player 208 may utilize an LCD display for displaying vehicle feature codes and modes thereof in a similar manner to display 34 of control system 30 (FIGS. 1 and 2). Lastly, it should be understood that though the inventive control system is capable of generating any suitable user recognizable comment in both audible and graphical form. For example, visual comments may be stored on data storage unit 207 and produced via display 204 and/or another display (e.g. associated with media player 208) during the customization process.

It should thus be appreciated that there has been provided a vehicular on-board system capable of providing substantial assistance to an operator of a vehicle regarding the customization of a plurality of adjustable vehicular operational features that is relatively easy to understand and operate.

The invention claimed is:

1. An interactive system for customizing at least one operational feature on a vehicle by an operator from within the vehicle, said system comprising:
   a personalization master for automatically determining operator identity and transmitting a corresponding operator identification signal;
   a trip stem for receiving operator selection data within the vehicle;
   a message generating device comprising a storage device for storing information, a sound generating device for generating a plurality of audible operator recognizable comments in response to and coordinated with said operator selection data, and a display device responsive to the operator selection data, said comments for assisting said operator in the customization of said at least one operational feature; and
   a processor coupled to said personalization master, said trip stem and said message generating device for receiving the operator identification signal, recalling a plurality of settings associated with the operator identity, recognizing said operator selection data, and directing said message generating device to generate selected ones of said audible operator recognizable comments.

2. An interactive system according to claim 1 wherein said storage device comprises a compact disc player and wherein said information is stored on a compact disc.

3. An interactive system according to claim 1 wherein said sound generating device comprises at least one speaker.

4. An interactive system according to claim 1 wherein said trip stem further comprises controls of said vehicle's onboard entertainment center.

5. An interactive system according to claim 1 wherein said trip stem further comprises controls of a Driver Information Center.

6. An interactive system according to claim 1 wherein said trip stem comprises control associated with said at least one operational feature of the automobile.

7. A method for customizing at least one operational feature of an automotive vehicle from within the vehicle, said method comprising:
   determining an operator's identity and automatically transmitting a corresponding operator identification signal to a processor via a personalization master;
   inserting a media storage device containing a plurality of operator recognizable comments into a media player;
   inputting operator data via a trip stem within the vehicle and displaying information responsive thereto;
   processing said operator identification signal and said operator data in said processor, wherein said processor is coupled to said personalization master, said trip stem and said media storage device;
   recalling a plurality of settings associated with the operator;
   selecting at least one audible operator recognizable comment from said plurality of operator recognizable comments in response to said operator data; and
   generating said at least one operator recognizable comment via a message generating means coupled to said media player such that said operator recognizable comment is coordinated with the step of inputting operator data.

8. A method according to claim 7 wherein said inserting comprises inserting a compact disc into a compact disc player.

9. A method according to claim 8 wherein said message generating means comprises at least one speaker.

10. A method according to claim 9 wherein said message generating means further comprises a display and said generating further comprises generating a graphical comment.

11. A method according to claim 10 wherein said inputting further comprises manipulating vehicle control elements.

12. A method according to claim 11 wherein said inputting further comprises manipulating controls of a Driver Information Center.

13. A method according to claim 11 wherein said inputting further comprises manipulating controls of an onboard entertainment system.

14. A method according to claim 11 wherein said inputting further comprises manipulating controls associated specifically with said operation features.

* * * * *